(12) United States Patent
Ahrens et al.

(10) Patent No.: US 6,701,710 B1
(45) Date of Patent: Mar. 9, 2004

(54) TURBOCHARGED ENGINE WITH TURBOCHARGER COMPRESSOR RECIRCULATION VALVE

(75) Inventors: William K. Ahrens, Novi, MI (US); Brian A. Lewallen, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 10/241,929

(22) Filed: Sep. 11, 2002

(51) Int. Cl.[7] ................................. F02B 33/44
(52) U.S. Cl. .................. 60/605.2; 60/605.1; 60/611; 123/564
(58) Field of Search ............... 60/605.2, 605.1, 60/611; 123/564

(56) References Cited

U.S. PATENT DOCUMENTS

| | | | |
|---|---|---|---|
| 4,702,218 A | * 10/1987 | Yoshioka et al. | 60/605.2 |
| 4,817,387 A | * 4/1989 | Lashbrook | 60/611 |
| 4,956,973 A | * 9/1990 | Fortnagel et al. | 60/605.2 |
| 5,526,645 A | * 6/1996 | Kaiser | 60/611 |
| 5,694,899 A | * 12/1997 | Chvatal et al. | 60/611 |
| 6,327,856 B1 | * 12/2001 | Iwabuchi et al. | 60/605.2 |
| 6,550,461 B2 | * 4/2003 | Robitschko | 60/611 |
| 2003/0000507 A1 | * 1/2003 | Kobayashi et al. | 60/605.2 |

FOREIGN PATENT DOCUMENTS

JP      2001 329879 A  * 11/2001  .......... F02B/37/00

* cited by examiner

Primary Examiner—Thomas Denion
Assistant Examiner—Thai-Ba Trieu
(74) Attorney, Agent, or Firm—Fildes & Outland, P.C.

(57) ABSTRACT

An internal combustion engine includes an intake manifold supplying charge air to the cylinders. An exhaust manifold conducts exhaust gas away from the cylinders. A turbocharger including a turbine has an exhaust gas inlet connected with the exhaust manifold and also includes a compressor having an air inlet and outlet. The compressor air outlet is connected to the intake manifold to pressurize charge air during high power levels of engine operation. An EGR bypass connected between the turbine exhaust gas inlet and the intake manifold recirculates a portion of the exhaust gases to the cylinders. An intake air bypass adapted to recirculate a portion of compressor outlet air back to the compressor air inlet to reduce compressor outlet pressure and aid EGR flow through the EGR bypass to the cylinders during high power operation of the engine is connected between the compressor air outlet and the compressor air inlet.

2 Claims, 3 Drawing Sheets

TURBOCHARGED ENGINE WITH TURBOCHARGER COMPRESSOR RECIRCULATION VALVE

TECHNICAL FIELD

The present invention relates to turbocharged internal combustion engines and more particularly to such an engine with an exhaust gas recirculation system and a turbocharger compressor recirculation valve to lower turbocharger compressor discharge pressure and thereby assist exhaust gas recirculation flow.

BACKGROUND OF THE INVENTION

It is known in the art of controlling the generation of undesirable pollutant gases and particulate matter in the operation of internal combustion engines to use an exhaust gas recirculation (EGR) system. EGR systems recirculate exhaust gas into the engine intake air supply reducing the concentration of oxygen, which lowers the combustion temperature within the cylinder and slows the chemical reaction of a combustion process, decreasing the formation of nitrous oxides ($NO_x$). Additionally unburned hydrocarbons contained in exhaust gas are re-introduced into the engine cylinders which further reduces the emission of undesirable hydrocarbons.

In some internal combustion engines and particularly diesel engines a turbocharger is used to increase engine performance. Therein the exhaust gas to be recirculated is diverted upstream of the exhaust gas turbine associated with the turbocharger.

In a high pressure system exhaust gas is pumped directly into the intake manifold. However, under lower speed and high torque conditions, the boost pressure is higher than the exhaust manifold pressure and recirculation of exhaust gases is not possible. A present method of generating EGR flow to correct this problem has been to use various devices such as back pressure valves or restrictive turbines such as a variable nozzle turbine (VNT).

With a variable nozzle turbine its vanes are adjustably closable to restrict exhaust gas flow through the turbine. Thereby turbine inlet pressure is increased to a point where it exceeds the intake manifold pressure as generated by the turbocharger compressor. During the process the exhaust gas that does pass between the vanes of the turbine has a higher velocity, due to the reduced cross-sectional area between the vanes. This increased gas velocity, when it strikes the turbine wheel, causes higher wheel rotational speed. This higher speed on the compressor side causes increased boost or compressor discharge pressures. The overall impact, therefore, is that the very concept used to increase EGR flow by increasing the turbine inlet pressure, also increases the compressor discharge and intake manifold pressure, thereby hindering further increases in EGR flow.

The result is that compressor discharge and intake manifold pressures become unacceptably high in the effort to generate higher EGR flow rates for reduced $NO_x$ emissions. These high intake manifold pressures tax the capability of the charge cooling system and associated ducting to withstand the higher pressures and contribute to unacceptably high combustion peak firing pressures. Another unwanted result is that the turbocharger rotation speeds can become unacceptably high during high load engine operation.

SUMMARY OF THE INVENTION

The present invention provides an internal combustion engine having means to lower turbocharger compressor discharge and intake manifold pressure allowing an appropriate EGR flow rate to be more readily generated at lower turbocharger rotational speeds and reducing combustion peak firing pressure.

The present invention also provides an intake air bypass that allows turbocharger compressor discharge air to be recirculated back into the turbocharger compressor inlet. A control valve may be provided to control bypass flow.

The present invention optionally provides a pressure relief device for bypassing charge air back to the turbocharger compressor inlet as a function of engine operating conditions. At lower engine loads, the device is closed and EGR systems operate normally. At sufficiently high engine loads, the compressor discharge pressure will rise to the level of the pressure relief devices opening pressure, allowing charge air to be recirculated back to the turbocharger compressor inlet. This recirculated charge air allows the intake manifold pressure to remain low enough to cause the pressure difference between the turbine inlet and the intake manifold to be sufficiently large to allow the proper EGR flow.

In engines using a variable nozzle turbine, a more open VNT vane position allows the turbocharger to rotate at a lower speed which is beneficial to turbocharger durability. The lowering of the intake manifold results also in a decrease in the combustion peak firing pressure, which is beneficial to engine durability.

Accordingly an internal combustion engine in accordance with the invention includes a block having a plurality of cylinders. An intake manifold is fluidly connected to the block for supplying charge air to the cylinders. An exhaust manifold is fluidly connected to the plurality of cylinders for conducting exhaust gas away from the cylinders. A turbocharger including a turbine having an exhaust gas inlet is fluidly connected with the exhaust manifold. The turbocharger also includes a compressor having a compressor air inlet and air outlet. The compressor air outlet is fluidly connected to the intake manifold to pressurize the charge air during high power levels of engine operation.

An EGR bypass is fluidly connected between the turbine exhaust gas inlet and the intake manifold to recirculate a portion of the exhaust gases to the cylinders. An intake air bypass is fluidly connected between the compressor air outlet and the compressor air inlet. The intake air bypass is adapted to recirculate a portion of compressor outlet air back to the compressor air inlet to reduce compressor outlet pressure and aid EGR flow through the EGR bypass to the cylinders during high power operation of the engine.

In one embodiment of the invention the turbocharger includes a variable geometry turbine operable to raise engine exhaust pressure by restricting exhaust gas flow to the turbine. The intake air bypass includes a control valve operable to control bypass flow. The control valve may be a pressure relief valve that is opened by excess pressure from the compressor outlet. Alternatively the control valve may be operated by suitable engine control apparatus.

The engine may include a charge air cooler fluidly connected between the compressor air outlet and the intake manifold for cooling compressed charge air prior to delivery into the cylinders. The intake air bypass may be fluidly connected with an outlet of the charge air cooler to provide cool air to the compressor inlet.

The EGR bypass can be fluidly connected with the intake manifold after the connection of the intake air bypass with the compressor air outlet to avoid recirculating exhaust gas to the compressor air inlet.

The EGR bypass may include a cooler to cool hot exhaust gas prior to entering the intake manifold.

These and other features and advantages of the invention will be more fully understood from the following detailed description of the invention taken together with the accompanying drawings.

DETAILED DESCRIPTION OF THE INVENTION

Figure 1:
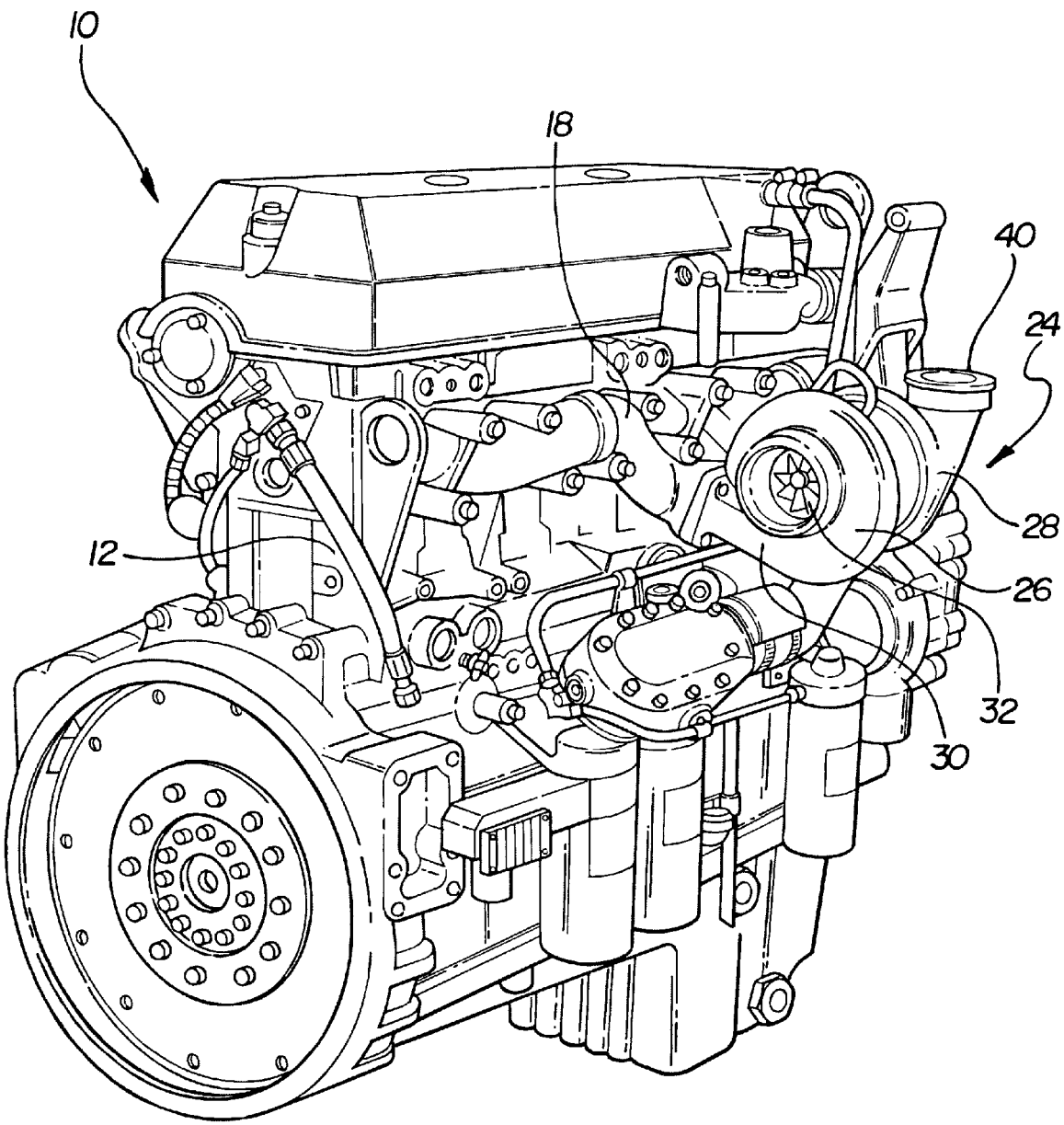
FIG. 1 is a perspective view of a turbocharged diesel internal combustion engine adapted to include an EGR system and a turbocharger compressor recirculation valve system in accordance with the present invention.
Figure 2:
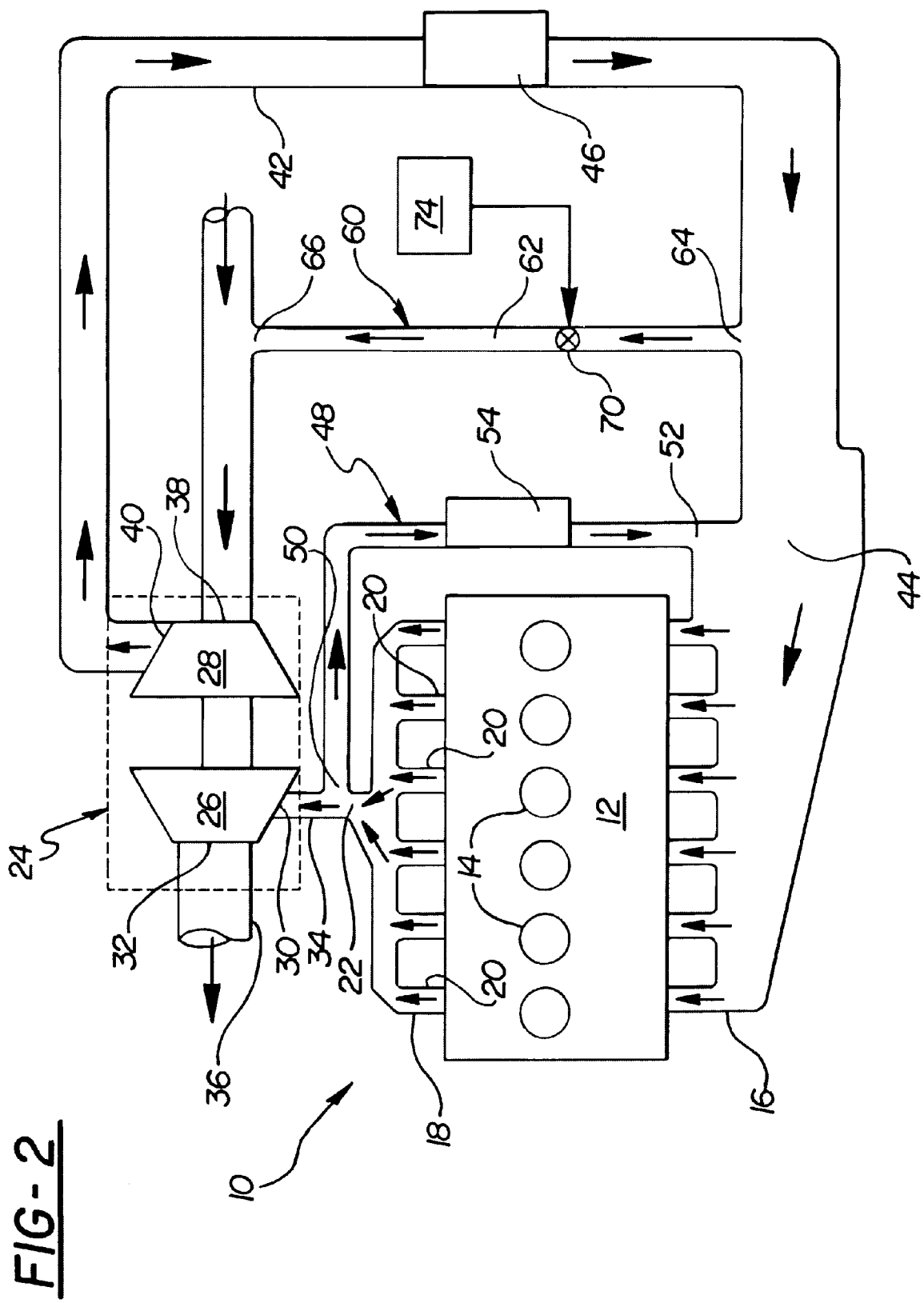
FIG. 2 is a schematic illustration of an internal combustion engine similar to that of FIG. 1 including an EGR system and a turbocharger compressor recirculation valve system.

Referring to FIGS. 1 and 2, there is shown a representative internal combustion engine 10. Internal combustion engine 10 includes a block 12 having a plurality of cylinders 14. An intake manifold 16 is fluidly connected to the block for supplying charge air to the cylinders 14. An exhaust manifold 18 having a plurality of exhaust gas inlet ports 20 is fluidly connected to the plurality of cylinders 14 for conducting exhaust gases from the cylinders. Exhaust manifold 18 also has an exhaust gas outlet port 22.

A turbocharger 24 includes a turbine 26 and a compressor 28. Turbine 26 is driven by exhaust gas received from exhaust manifold 18. Turbine 26 in turn drives compressor 28 through a mechanical connection as is generally known. Turbine 26 includes an exhaust gas inlet 30 and an exhaust gas outlet 32. Turbine exhaust gas inlet 30 is connected by a fluid conduit 34 to the manifold exhaust gas outlet port 22. The turbine exhaust gas outlet 32 is connected to an exhaust system fluid conduit 36. Turbine 26 may be a variable geometry turbine operable to raise engine exhaust pressure by restricting exhaust gas flow to the turbine.

Compressor 28 includes a compressor air inlet 38 for receiving ambient air and a compressor air outlet 40. Compressor air outlet 40 is connected by a fluid conduit 42 to an air intake port 44 of intake manifold 16 to pressurize the charge air during high power levels of engine operation. An air cooler 46 may be disposed in the air flow along conduit 42 to cool compressed charge air prior to delivery into the cylinders 14.

An EGR bypass 48 of known construction is fluidly connected between the turbine exhaust gas inlet 30 and intake manifold 16 to recirculate a portion of the exhaust gases to the cylinders 14. EGR bypass 48 includes an EGR inlet 50 fluidly connected to fluid conduit 34 and an EGR outlet 52 fluidly connected to the air intake side of the intake manifold 16. An air cooler 54 may be disposed in the air flow through EGR bypass 48 to cool hot exhaust gas prior to entering the intake manifold 16.

An intake air bypass 60 includes a fluid conduit 62 having a compressed charge air inlet 64 and a discharge outlet 66 fluidly connecting the compressor air outlet 40 with the compressor air inlet 38. The compressed charge air inlet 64 is fluidly connected to the compressor air outlet along fluid conduit 42 and the discharge outlet 66 is fluidly connected to the compressor air inlet 38.

The intake air bypass 60 is adapted to recirculate a portion of compressor outlet air back to the compressor air inlet 38 to reduce compressor outlet pressure and aid EGR flow through the EGR bypass 48 to the cylinders 14 during high power operation of the engine 10.

Preferably the intake bypass charge air inlet 64 is connected downstream of air cooler 44, if provided, to thereby provide cooled compressed air to the compressor air inlet 38.

Figure 3:
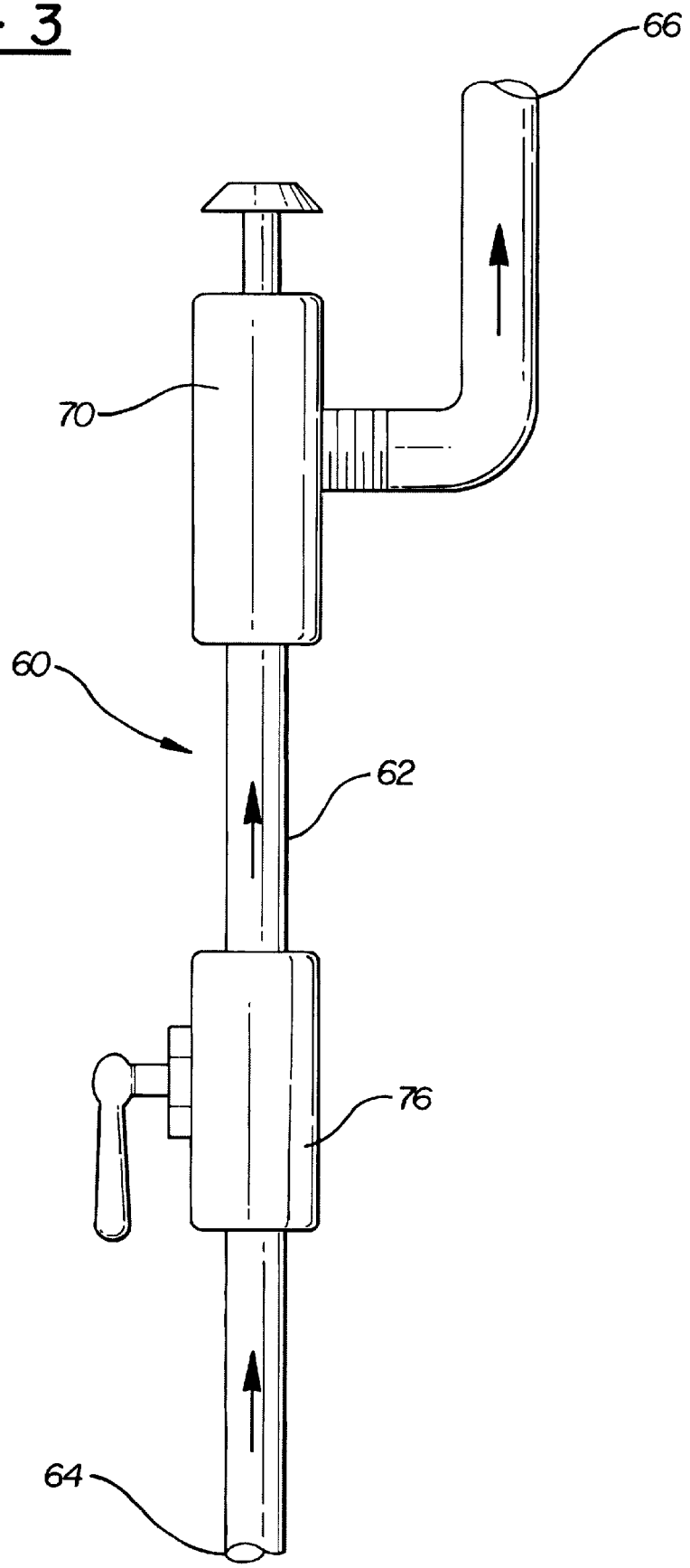
FIG. 3 is a schematic view of one embodiment of the turbocharger compressor recirculation valve system in accordance with the present invention.

With further reference to FIG. 2 and with reference to FIG. 3 in one embodiment of the invention, the intake air bypass 60 includes a control valve 70 operable to control bypass flow. Control valve 70 may be a pressure relief valve that is opened by excess air pressure from the compressor outlet 40. Control valve 70 may be a spring release valve or other known pressure release device. Alternatively, control valve 70 may be an operable pressure relief valve that may be operated by suitable engine control apparatus 74 that operates the control valve in response to defined, sensed engine operating parameters. If desired fluid conduit 62 may be provided with a separate shutoff valve 76 (FIG. 3) to deactivate the compressor bypass system.

In a preferred embodiment of the invention, the EGR bypass 48 is connected via EGR outlet 52 to the intake manifold 16 downstream or after the connection of the intake air bypass charge air inlet 64 to avoid recirculating exhaust gas to the compressor air inlet 38.

In use, the intake air bypass 60 recirculates a portion of the compressed charge air back to the compressor air inlet 38 when the pressure of the charge air exceeds a specified predetermined pressure. Such recirculation lowers the intake manifold pressure to assure appropriate EGR flow rates at lower turbocharger rotational speeds and reduces combustion peak firing pressure.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. An internal combustion engine comprising:

a block including a plurality of cylinders;

an intake manifold fluidly connected to the block for supplying charge air to the cylinders;

an exhaust manifold fluidly connected to the plurality of cylinders for conducting exhaust gases from the cylinders;

a turbocharger including a turbine and a compressor;

the turbine having an exhaust gas inlet fluidly connected with the exhaust manifold;

the compressor having a compressor air inlet and air outlet, the compressor air outlet being fluidly connected to the intake manifold to pressurize the charge air during high power levels of engine operation;

an EGR bypass fluidly connected between the turbine exhaust gas inlet and the intake manifold to recirculate a portion of the exhaust gases to the cylinders; and an intake air bypass fluidly connecting the compressor air outlet with the compressor air inlet;

the intake air bypass being adapted to recirculate a portion of compressor outlet air back to the compressor air inlet to reduce compressor outlet pressure and aid EGR flow through the EGR bypass to the cylinders during high power operation of the engine;

wherein the turbocharger includes a variable geometry turbine operable to raise engine exhaust pressure by restricting exhaust gas flow to the turbine.

2. An internal combustion engine comprising:

a block including a plurality of cylinders;

an intake manifold fluidly connected to the block for supplying charge air to the cylinders;

an exhaust manifold fluidly connected to the plurality of cylinders for conducting exhaust gases from the cylinders;

a turbocharger including a turbine and a compressor;

the turbine having an exhaust gas inlet fluidly connected with the exhaust manifold;

the compressor having a compressor air inlet and air outlet, the compressor air outlet being fluidly connected to the intake manifold to pressurize the charge air during high power levels of engine operation;

an EGR bypass fluidly connected between the turbine exhaust gas inlet and the intake manifold to recirculate a portion of the exhaust gases to the cylinders;

an intake air bypass fluidly connecting the compressor air outlet with the compressor air inlet;

the intake air bypass being adapted to recirculate a portion of compressor outlet air back to the compressor air inlet to reduce compressor outlet pressure and aid EGR flow through the EGR bypass to the cylinders during high power operation of the engine; and a charge air cooler fluidly connected between the compressor air outlet and the intake manifold for cooling compressed charge air prior to delivery into the cylinders;

wherein the intake air bypass is fluidly connected with an outlet of the charge air cooler to provide cooled air to the compressor inlet.

* * * * *